BROAD BAND MAGNETIC TAPE SYSTEM AND METHOD

Filed July 25, 1955 6 Sheets-Sheet 1

INVENTORS
CHARLES P. GINSBURG
SHELBY F. HENDERSON, JR.
RAY M. DOLBY
CHARLES E. ANDERSON
BY Flehr & Swain
ATTORNEYS Oct. 11, 1960 C. P. GINSBURG ET AL 2,956,114

BROAD BAND MAGNETIC TAPE SYSTEM AND METHOD

Filed July 25, 1955 6 Sheets-Sheet 2

INVENTORS
CHARLES P. GINSBURG
SHELBY F. HENDERSON, JR.
RAY M. DOLBY
CHARLES E. ANDERSON

BY Flehr and Swain

ATTORNEYS

BROAD BAND MAGNETIC TAPE SYSTEM AND METHOD

Filed July 25, 1955 6 Sheets-Sheet 3

INVENTORS
CHARLES P. GINSBURG
SHELBY F. HENDERSON, JR.
RAY M. DOLBY
CHARLES E. ANDERSON
BY Flehr & Swain
ATTORNEYS

BROAD BAND MAGNETIC TAPE SYSTEM AND METHOD

Filed July 25, 1955 6 Sheets-Sheet 4

INVENTORS
CHARLES P. GINSBURG
SHELBY F. HENDERSON, JR.
RAY M. DOLBY
BY CHARLES E. ANDERSON
Flehr and Swain
ATTORNEYS

BROAD BAND MAGNETIC TAPE SYSTEM AND METHOD

Filed July 25, 1955 6 Sheets-Sheet 5

INVENTORS
CHARLES P. GINSBURG
SHELBY F. HENDERSON, JR.
RAY M. DOLBY
CHARLES E. ANDERSON
BY
ATTORNEYS

BROAD BAND MAGNETIC TAPE SYSTEM AND METHOD

Filed July 25, 1955 6 Sheets-Sheet 6

INVENTORS
CHARLES P. GINSBURG
SHELBY F. HENDERSON, JR.
RAY M. DOLBY
CHARLES E. ANDERSON

BY Flehr & Swain

ATTORNEYS

United States Patent Office
2,956,114
Patented Oct. 11, 1960

2,956,114

BROAD BAND MAGNETIC TAPE SYSTEM AND METHOD

Charles P. Ginsburg, Los Altos, Shelby F. Henderson, Jr., Woodside, Ray M. Dolby, Cupertino, and Charles E. Anderson, Belmont, Calif., assignors to Ampex Corporation, Redwood City, Calif., a corporation of California Filed July 25, 1955, Ser. No. 524,004

8 Claims. (Cl. 178—6.6)

This invention relates generally to electromagnetic tape systems, methods and apparatus, particularly to systems and methods of this character capable of recording and reproducing signal intelligence over a wide frequency spectrum, including for example, video frequencies.

Various problems are involved when it is attempted to record and reproduce frequencies over a wide spectrum, as for example frequencies ranging higher than one megacycle, on magnetic tape. Assuming the use of reasonable tape speeds, conventional equipment is limited with respect to its usable frequency range. The recordable range can be increased by increasing the speed of the tape, but the speeds required for the recording of such high frequencies are such that the system becomes impractical because of the large amount of tape employed for a given recording period. It is possible to reduce the linear tape speed by recording successive tracks extending laterally across the tape. Equipment with this purpose involves the use of magnetic record units which are mounted to sweep successively across the coated surface of the tape while the tape is being advanced in the direction of its length. While this arrangement makes it theoretically possible to provide relative speeds such that frequencies up to four megacycles or higher can be recorded, its application necessarily involves a number of problems. For example the outputs of the several heads are subject to amplitude variations, due to various causes such as lack of exact registration on the recorded track, amplitude variations in the record because of slight variations in pressure between the several heads, and slight variations in the electrical characteristics of the heads. The conventional magnetic tape recording system, using currents varying in amplitude for application to the recording head, is particularly susceptible to undesired amplitude variations. The undesired signal variations cause distortion of the reproduced signal, and make it difficult if not impossible to reproduce the original frequency spectrum with reasonable fidelity, and particularly with sufficient fidelity to permit the recording and reproduction of television or like visual images.

The present invention is predicated upon certain discoveries which we have made, and which we utilize to advantage in the present invention. Particularly we have found that a wide frequency spectrum can be successfully recorded and reproduced by the use of a frequency modulation system in which the deviation of the carrier is small relative to the highest frequency components to be transmitted. In other words we have found that it is practical to use what can be referred to as narrow band F.-M. Narrow band F.-M. means that the ratio of $\Delta f/f_m$ is relatively small, and in actual practice can be of the order of 0.2, where $\Delta f$ represents deviation corresponding to maximum signal amplitude and $f_m$ represents the highest modulating frequency. Likewise we have found that the limit of $f_m$ can be made reasonably close to the carrier frequency. We have also discovered that the center or carrier frequency can be so selected that it is near the upper recordable frequency limit of the apparatus, which as previously explained is generally determined by the relative speed between the heads and the tape and the characteristics of the head. When the carrier frequency is so selected the recording system depends upon single sideband or vestigial sideband transmission. In other words the upper band of frequencies containing the frequency modulation components is not recorded or reproduced to any substantial extent. We have found that such a magnetic record can be reproduced to provide, after demodulation, the original modulating frequencies with a good degree of fidelity.

In addition to the foregoing, a practical system for the recording and reproduction of frequencies over a wide spectrum requires highly accurate speed control means for both recording and reproduction.

It is an object of the present invention to provide a system and method for the recording and reproduction of a wide frequency band, which will be relatively immune to spurious variations in signal strength.

Another object of the invention is to provide a system and method of the above character which, when used for the recording and reproduction of video frequencies, makes possible the reproduction of visual images with good fidelity.

Another object of the invention is to provide a system and method of making use of narrow band frequency modulation for recording over a wide frequency band.

Another object of the invention is to provide improved means for controlling the speed of operation of various parts during recording and reproduction.

Another object of the invention is to provide a system and apparatus for the recording of frequency components over a wide spectrum, such as video frequencies, which utilizes a plurality of record heads sweeping laterally across a magnetic tape, but without causing troublesome distortion or disturbances of the reproduced signal due to amplitude variations.

Additional objects and features of the invention will appear from the following description in detail in conjunction with the accompanying drawings.

Referring to the drawings.

Figure 1:
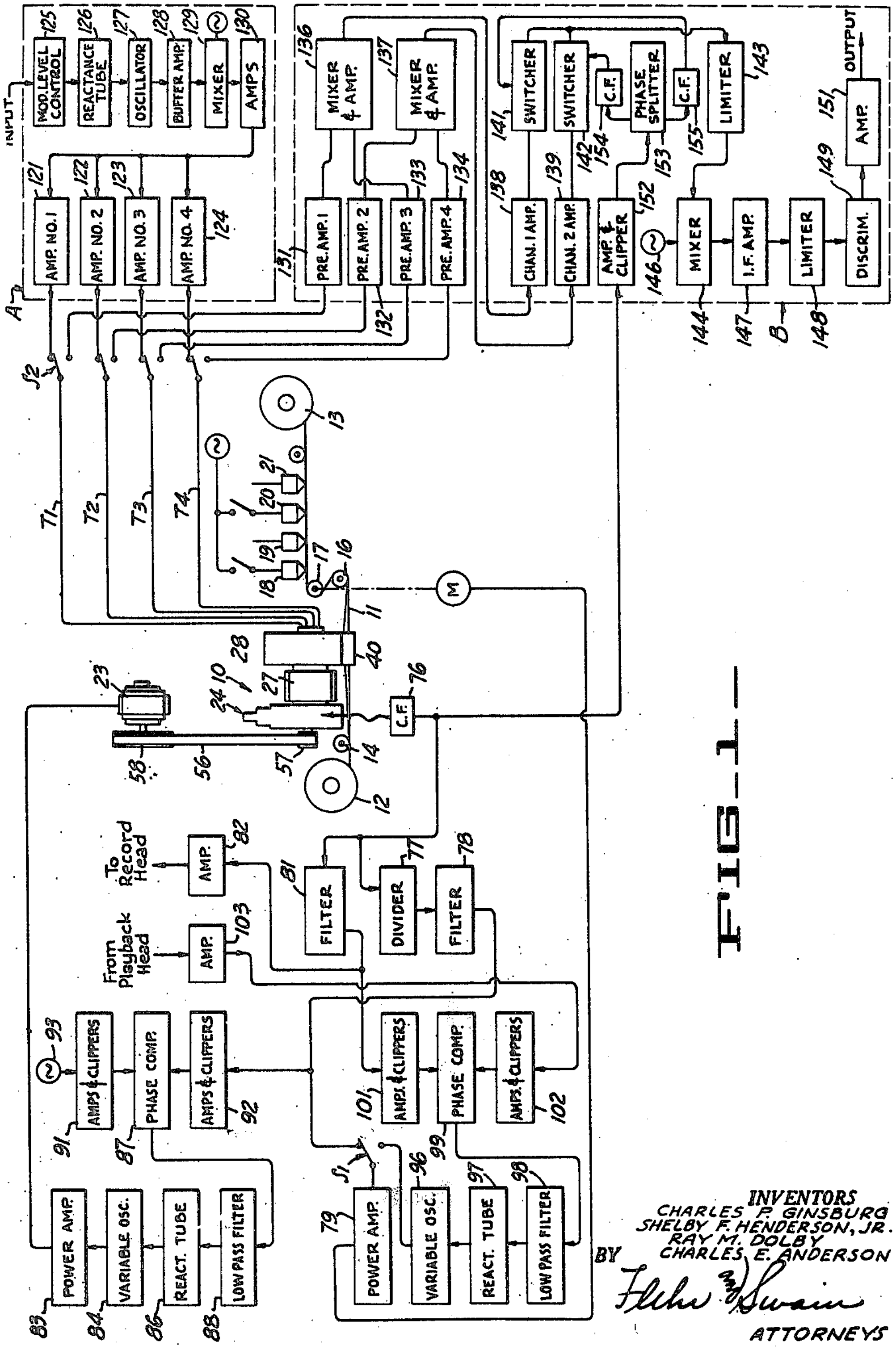
Figure 1 is a circuit diagram illustrating a complete recording and reproducing system incorporating the present invention.

The present system and method employs apparatus 10 (Figure 1) of the type having a plurality of record (i.e. transducer) units which are caused to sweep successively across a magnetic tape, as the tape is being moved in the direction of its length. Preferably the sweep paths of the units are rectilinear, and the tape is cupped or curved to conform to the surface of a cylinder in the region where it is being contacted by the units. Suitable apparatus of this type is illustrated in Figures 3 to 8 inclusive. The transport means illustrated for carrying and feeding the tape includes conventional supply and take up reels 12 and 13, which can be carried by suitable turntables. Guide studs or rollers 14 and 16, which are preferably flanged, are disposed to engage the tape at spaced distances from the operating end of the head assembly. The tape also engages a driving capstan 17, and for a purpose to be presently explained it is shown in contact with the magnetic heads 18, 19, 20 and 21, which operate upon the edges or margins of the tape. The tape employed is of substantial width compared to tape used with conventional magnetic equipment. For example it may have a width of the order of 2 inches, and like magnetic tape now available on the market for sound recording equipment, it can consist of a pliable film of plastic material having a thin coating of magnetic material on one side of the same.

The magnetic head assembly is driven by an electric motor 23, preferably through a belt drive as will be presently described. Pulse generating means 24 is associated with the head and serves to generate pulses having a frequency dependent upon the speed of rotation of the head assembly. This means is used in conjunction with the speed control system.

Figures 3, 4, 5:
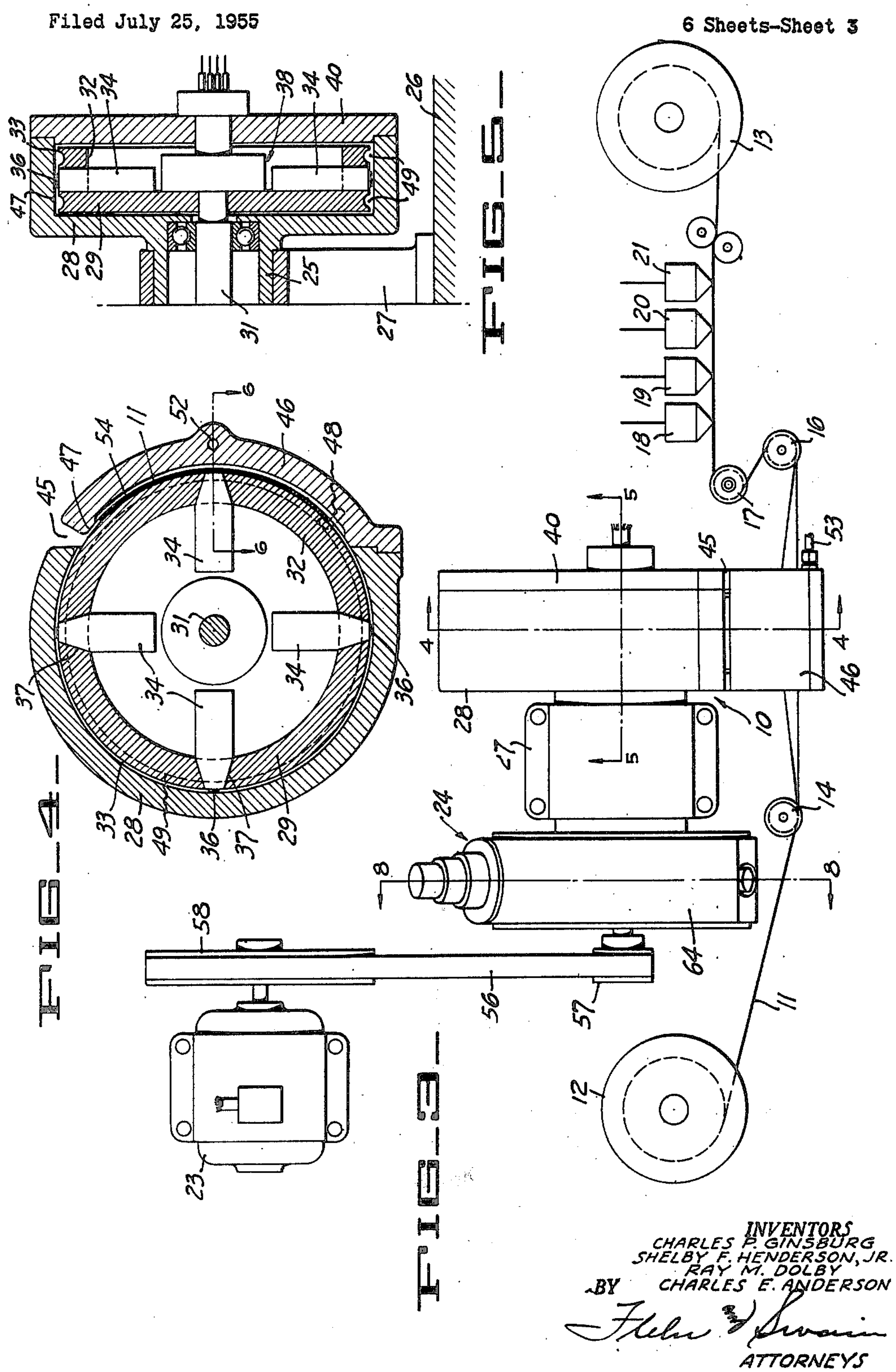
Figure 3 is a plan view schematically illustrating mechanism for mounting the magnetic heads and for transporting the tape.
Figure 4 is a cross sectional view taken along the line 4—4 of Figure 3.
Figure 5 is a cross sectional detail taken along the line 5—5 of Figure 3.

To describe the rotary head assembly in greater detail, it consists of a stationary housing or shell 25 that is carried upon a mounting panel 26 by suitable means such as the base 27. The enlarged portion 28 of the shell encloses a rotatable member 29 that is carried by the shaft 31 (Figure 5).

Member 29 is provided with an annular rim 32 and is formed to provide a cylindrical peripheral surface 33 of substantial width. Member 29 serves to mount a plurality of magnetic transducer units 34. These units can be made according to known techniques and can consist, for example, of U-shaped magnetic core pieces having windings, and pole tips spaced by a thin non-magnetic gap, as for example a gap of the order of 0.0005 inch. The pole tips of each magnetic unit form the tip end 36 which extends slightly beyond the peripheral surface 33. The width of each tip as measured in a direction longitudinally of the shaft 31 should be relatively small, as for example 0.010 inch. Each magnetic transducer unit made as described above can be embedded in a body of plastic material to form the complete unit 34. The rim 32 is shown with a plurality of tapered slots 37 within which the units are accommodated in the manner illustrated in Figure 4. Suitable means can be used to hold the units in place.

Figures 10, 11, 12, 13:
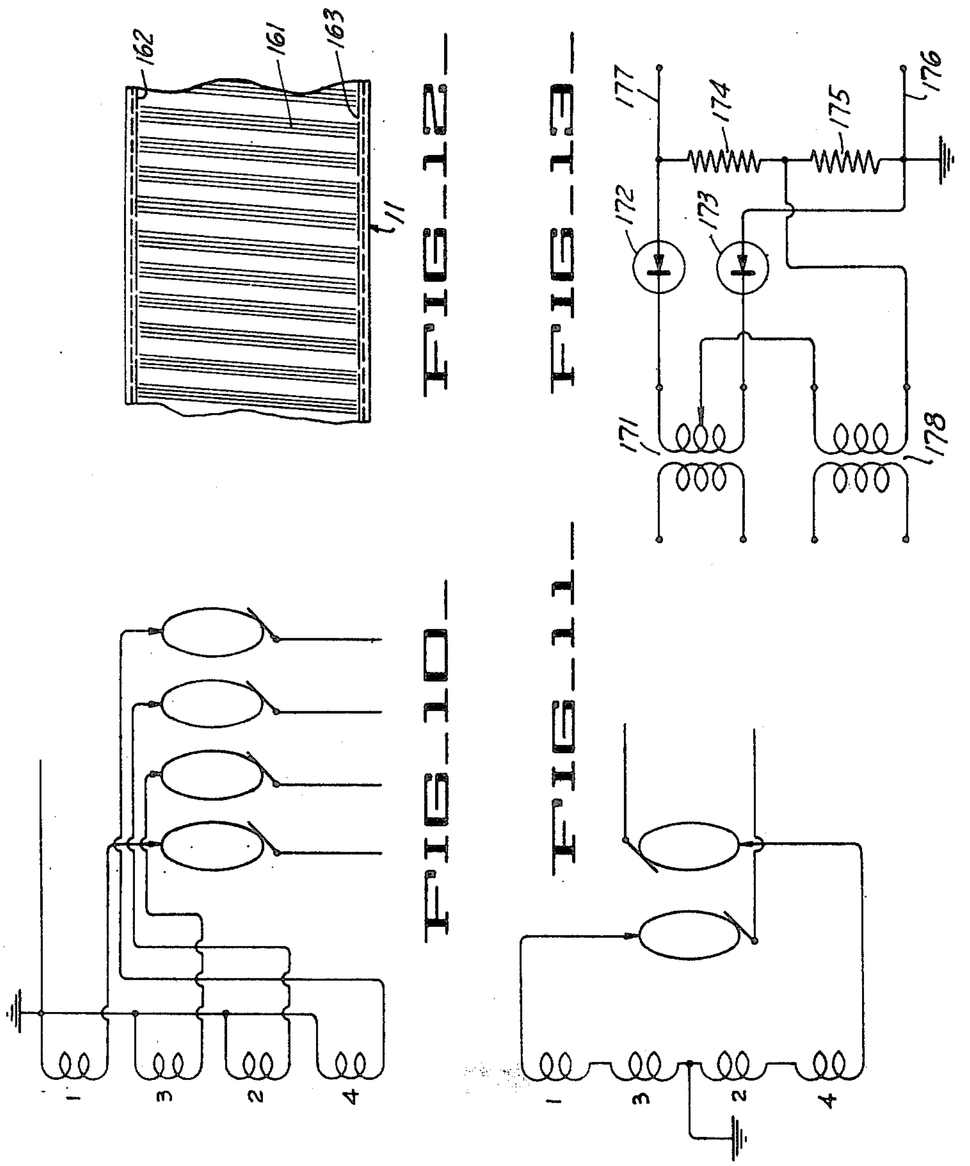
Figure 10 is a circuit diagram schematically illustrating the commutating means for making connections with the various magnetic heads.
Figure 11 is a diagram like Figure 10, but showing simplified connections.
Figure 12 is a plan view schematically illustrating a piece of magnetic tape, and the tracks formed on the same.
Figure 13 is a circuit diagram illustrating a suitable phase comparator which can be used in the system.

In Figure 10 the magnetic units are represented by coils 1, 2, 3 and 4. One side of each coil is grounded through the motor shaft and the other side is connected to a slip ring. The ground connection can be made through suitable means (not shown) such as a silver button on one end of the shaft which engages a grounded graphite brush. The brushes engaging the slip rings connect with output leads as will be presently described. The assembly 38 shown in Figure 5, is representative of a slip ring assembly, which makes connection to the coils in the manner illustrated in Figure 10, and which provides four output leads. The enlarged shell portion 28 can be conveniently provided with a cover 40 which may mount the stationary part of assembly 38.

Figure 7:
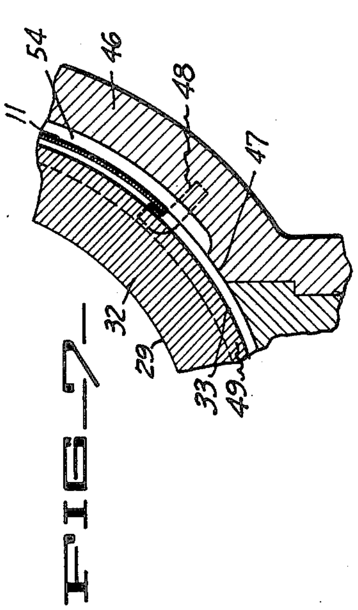
Figure 7 is an enlarged detail illustrating means for engaging the lower edge of the tape, while it is passing through the guide means.

Special means is provided in conjunction with the head for bending that portion of the tape adjacent the head to arcuate form, whereby it conforms to the circular path through which the pole tips 36 pass. Thus a stationary guide member 46 is provided which has an inner arcuate surface 47 (Figure 4). This surface conforms to the arc of a circle, the circle having a center coincident with the axis of shaft 31. The magnetic tape 11 is positioned between the surface 47 and peripheral surface 33 of the head. Application and removal of the tape is facilitated by providing an access slot 45 at the upper end of member 46. At one end of the surface 47, members 48 (Figure 7) are provided which may be hook-shaped as illustrated, and which form shoulders for engaging the adjacent edge of the tape. The direction of rotation of the head is such that friction between the head and the tape urges the tape against the members 48. As illustrated in Figure 7 (in conjunction with Figure 4) the periphery 33 of the head can be provided with grooves 49 to accommodate members 48.

In operation physical contact is maintained between one side of the tape and the curved surface 47. To insure such contact the arcuate surface 47 can be interrupted by the grooves 51, which terminate short of the ends of the surface 47, and are connected to suitable evacuating means. Thus in Figure 6 both grooves 51 are shown connected to the duct 52 and from thence to the tube 53. This tube can lead to a suitable evacuating chamber, which in turn is connected to an evacuating pump.

Maintenance of a partial vacuum or subatmospheric pressure in grooves 51 serves to apply pneumatic pressure to the tape in the direction to urge the tape into intimate contact with the surface 47. While the suction retaining means just described is deemed desirable, it is not essential and may be omitted.

Figure 6:
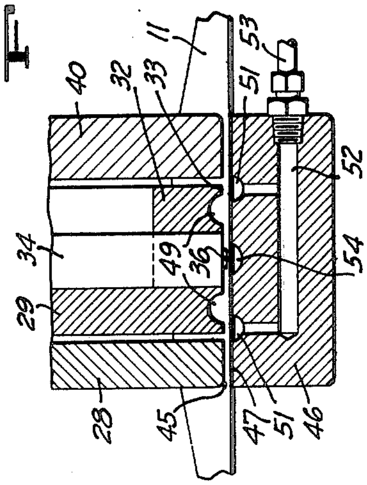
Figure 6 is an enlarged cross sectional detail illustrating the guide means for the tape and the manner in which the tape is contacted by the magnetic heads.

Previous reference has been made to the fact that the pole tips 36 preferably extend a slight distance from the peripheral surface 33. As shown in Figure 6 the guide member 46 is provided with a circumferential groove 54, whereby the tape is not supported in the region of contact with the pole tips. This permits a slight amount of deflection of the tape at the region of contact to insure relatively uniform pressure of contact between the pole tips and the magnetic coating.

In the construction illustrated a part of the enlarged portion 28 of the shell 25 has been cut away to accommodate the guide member 46. Also the guide member is shown mounted by attaching it directly to the shell.

The motor 23 may be directly connected to the shaft 31. However in this instance we have reduced the speed requirements by providing a suitable drive connection. Thus a drive belt 56 (Figure 3) is shown engaging a pulley 57 on the shaft 31, and a pulley 58 on the shaft of the motor 23. The belt can be one of the type made of nylon or like synthetic fabric.

Figure 9:
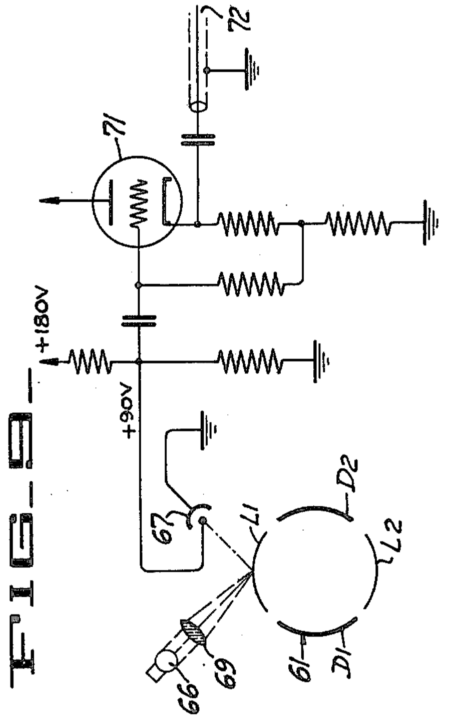
Figure 9 is a schematic view illustrating the pulse generating means and the cathode follower which may connect to the same.
Figure 8:
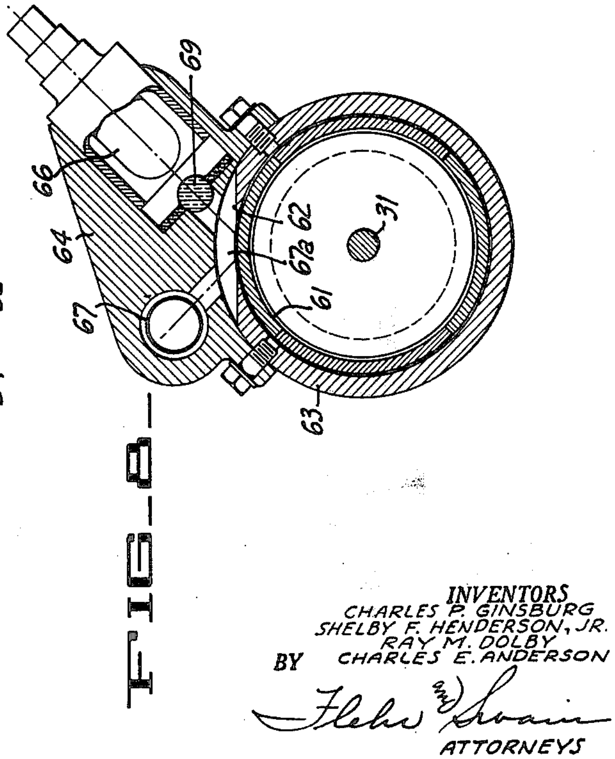
Figure 8 is a cross sectional detail taken along the line 8—8 of Figure 3, and showing suitable pulse generating means.

The pulse generating means 24 can be one of the photoelectric type as shown in Figures 8 and 9. Thus a wheel or drum 61 is carried by that end of the shaft 31 remote from the operating end of the head and provides a peripheral light reflecting surface 62. An enlarged shell portion 63 encloses the drum 61, and serves to carry the mounting block 64. Within the block 64 there is a lamp 66 and a photoelectric tube 67. The shell is cut away as indicated at **67*a* whereby light focused by lens 69 is directed upon the peripheral surface 62. Reflected light is directed upon photoelectric tube 67**. The arrangement is such that the photoelectric tube receives reflected light from a small spot or point upon the peripheral surface 62. As shown particularly in Figure 9, the surface 62 is formed in equal segments which are alternately light and dark. In schematic Figure 9 the light areas are indicated as L1 and L2 and the dark areas as D1 and D2. As shown in Figure 9, the photoelectric tube 67 can be coupled to the input of vacuum tube 71, which is connected to operate as a cathode follower.

It will be evident that the pulse generating means described above will serve to generate a square wave form, having a frequency directly dependent upon the speed of rotation of the shaft 31. As previously mentioned this frequency is used in conjunction with the speed control system. In addition it can be used for performing certain circuit switching functions in the reproducing system.

The apparatus described above operates as follows: Assuming that the shaft 31 is being driven at a constant speed by the motor 23, the capstan 17 is driven by another motor, and the magnetic tape is fed from left to right as shown in Figure 1, or in other words, at right angles to the plane of rotation of the magnetic units 34. That portion of the tape extending between the guides 14 and 16 is cupped or bent into arcuate form, and that part of the bent tape adjacent the guide member 46 is caused to contact the arcuate surface 47.

The pole tips 36 of the magnetic units are caused to successively contact and sweep across the magnetic tape. The rate of feed is such that successive swept areas are displaced longitudinally of the tape. The swept areas are rectilinear, and extend nearly at right angles to the length of the tape. The tape during its movement maintains contact with the members 48. As will presently be explained for recording operations the coils 1, 2, 3 and 4 of the magnetic units are connected to means serving to supply a frequency modulated carrier. For reproducing operations the coils are connected to the input of a network including amplifying and demodulating means.

The apparatus described above requires proper speed control for both recording and reproducing operations. The complete system of Figure 1 incorporates means for controlling both the driving of the capstan and the driving of the head assembly. As illustrated in Figure 1 the block 76 represents the cathode follower 71, and is connected to the wave shaping filter 81 and the frequency divider 77. The divider serves to reduce the frequency of the pulses to a frequency convenient for operating the synchronous alternating current motor M (e.g. from 480 to 60 c.p.s.), which is schematically indicated for driving the capstan. Thus the output of the divider 77 is shown being passed through the filter 78, and from thence through switch S1 to the power amplifier 79. The output of this amplifier supplies current to the motor M. Filters 81 and 78 may be simple LC circuits tuned to the frequency being passed and serving to shape the wave to more nearly sine form.

The frequency of the pulse generating means is also recorded upon one margin of the tape, as a recorded control frequency. Thus the cathode follower 76 is shown having its output connected to the filter 81, and the output of this filter connects with the amplifier 82, which in turn connects with the record head 19.

The motor 23 for driving the head assembly is supplied with alternating current from the power amplifier 83, which has its input connected to the variable oscillator 84. The variable oscillator includes suitable means such as the variable reactance tube 86, whereby the frequency of operation of the oscillator can be controlled by varying the value of a controlling voltage. The controlling voltage is applied to the reactance tube by the phase comparator 87, which connects to the reactance tube through the low pass filter 88.

The amplifiers and clippers 91 and 92 are both connected to the phase comparator 87. A suitable source 93 of reference frequency, such as the ordinary 60 cycle current supply, connects with the amplifiers and clippers 91. The amplifiers and clippers 92 connect to the output of the wave shaping filter 78. Assuming that the filter 78 supplies current at a frequency of 60 c.p.s., and that the source 93 is nominally of the same frequency, then the controlling voltage developed by the phase comparator 87 is of a value dependent upon the amount of phase difference between the two applied alternating currents, namely that supplied from the reference and from the filter 78. The amplifiers and clippers 91 and 92 insure application of currents of the same amplitude to the phase comparator.

It will be evident from the foregoing that during a recording operation the frequency supplied by the pulse generating means is recorded as a control frequency along one margin of the tape, and a sub-multiple of this frequency, as for example 60 c.p.s., is applied to the phase comparator 87, together with a like frequency supplied from the reference source 93. Phase differences cause a change in the control voltage applied by the phase comparator to the reactance tube 86, and thus cause compensating changes in the frequency supplied to the driving motor 23. This arrangement serves to compensate for certain mechanical deficiencies of the apparatus, particularly slippage of the driving belt. When slippage tends to occur the change in the control voltage developed by the phase comparator 87 causes a compensating change in the frequency supplied by the amplifier 83, and this in turn causes a compensating change in the speed of the motor 23.

For reproducing operations switch S1 is shifted to connect the input of the amplifier 79 to the output of the variable oscillator 96. This oscillator includes the reactance tube 97, and is supplied through the low pass filter 98, with a controlling voltage from the phase comparator 99. The amplifiers and clippers 101 and 102 both apply signals of the same amplitude to the phase comparator 99. The amplifier and clipper 101 connects to the output of the wave shaping filter 81, and therefore receives a frequency corresponding to that generated by the pulse generator. The amplifier and clipper 102 connects to the output of amplifier 103, the input of which connects to the head 19, when used as a play-back head in reproducing operations. During reproducing operations it is therefore apparent that the capstan motor M is under close control by virtue of the manner in which the frequency of the current from power amplifier 79, is determined by the frequency of operation of the variable oscillator 96. The variable oscillator in turn is controlled by the value of the controlling voltage supplied from the phase comparator 99, and such value is determined by the phase relationship between the frequency of the pulse generator, and the frequency derived from the previously recorded control frequency, by the head 19. It will be evident that this causes the motor M to drive the tape past the head assembly at a speed precisely the same as that used during recording, and if slight variations in such speeds occur during recording, the same variations will be applied during reproduction. During reproduction the motor 23 is again controlled in the same manner as during recording.

In Figure 1 the electronics connected to the units of the head assembly, and used in recording, are indicated at A, and the electronics for play-back or reproduction, at B. For recording we have shown the record output amplifiers 121, 122, 123 and 124, having their outputs connected through the multiple switch S2, to the terminal leads T1, T2, T3 and T4 of the head assembly units. The broad band input, which may be video frequencies, is applied through the modulation level control 125 to a variable reactance tube 126 which modulates the frequency of the high frequency oscillator 127. By way of example in a television system this oscillator may operate at a frequency of 45 megacycles. The output of the amplifier is passed through a buffer amplifier 128 and to a mixer 129. The output of a beat oscillator operating at a suitable frequency is also applied to the mixer, and in the case of a television system this may for example be one operating at a frequency of 41 megacycles. The resulting difference frequency, which is 4 megacycles for the frequencies cited above, is the center frequency that is amplified by amplifier 130, and fed to the record amplifiers 121, 122, 123 and 124, which drive the units of the rotary head through T1, T2, T3 and T4, respectively.

The electronics for reproduction consists in this instance of the pre-amplifiers 131—134, which have their inputs connected to contacts on the multiple switch S2. The outputs of pre-amplifiers 131 and 133 are shown applied to the mixer and amplifier 136, and similarly the outputs of amplifiers 132 and 134 are shown applied to the mixer and amplifier 137. The two channels represented by the outputs of amplifiers 136 and 137 are shown being separately amplified by the amplifiers 138 and 139, and applied to the switching or gating means 141 and 142. These switching devices are of the electronic type adapted to be controlled by application of a controlling voltage, to either block or pass current from the outputs of amplifiers 138 and 139. The outputs of the switching devices connect through the limiter 143, to the mixer 144. In the mixer 144 the frequencies from the limiter 143 are mixed with a frequency from the source 146, to provide intermediate frequencies which are supplied to the intermediate frequency amplifier 147. The output of amplifier 147 is supplied to the amplitude limiter 148, and then to the discriminator 149, for demodulation. The output of the discriminator is amplified at 151 to provide an output of the reproduced frequencies.

Controlling pulses are supplied to the switching devices 141 and 142, from the pulse generator. Thus the output of the cathode follower 76 is also applied to the amplifiers and clippers 152, which connect with the phase splitter 153. Pulses from the phase splitter are applied through cathode followers 154 and 155, to the switching devices 141 and 142. As will be presently explained the switching operation is such that the channels 138 and 139 are turned on and off alternately (i.e. made alternately effective). Therefore during the sweep of a head unit across the tape its corresponding channel is effective, and the other channel is inoperative. The switching operation occurs shortly before a head leaves a record track, and after a succeeding head has entered its record track. The outputs of the channels 138 and 139 are combined and merged in the output circuit of the switchers 141 and 142.

By way of example where the speed of movement of each head assembly unit relative to the tape is of the order of 1700 inches per second, it is satisfactory to employ a center frequency of four megacycles. The frequency from source 146 applied to the mixer 144 can be of the order of 36 megacycles, thereby providing a center frequency of 32 megacycles for the intermediate frequency amplifier 147. For the speed of movement of the head units relative to the tape just specified by way of example, the frequency of four megacycles is near the upper frequency limit which can be effectively recorded by the use of conventional tape and head units of the magnetic type. For frequencies above four megacycles there is a rapid fall off in effective recording. However the fall off is gradual, and is not an abrupt cut off such as would cause undesirable effects. Therefore in effect we use vestigial sideband F.-M. recording, because sideband components substantially above four megacycles are not effectively recorded.

As previously stated we make use of narrow band frequency recording. Where $\Delta f$ represents deviation corresponding to maximum signal amplitude and $f_m$ represents the highest modulating frequency, the ratio of $\Delta f/f_m$ is relatively small, and in practice, making use of the values mentioned in the preceding paragraph, can be of the order of 0.2. The frequency deviations from the center frequency can be such that the center frequency of four megacycles which is impressed on the tape may depart from its average value by 500 kc., when the amplitude of the modulating signal is at its highest value.

It will be evident to those familiar with television systems that an input of video frequencies may be obtained from a standard television receiver, or may be taken directly from the output of the camera chain. Similarly the reproduced video output can be used to reproduce a visual image by utilizing an ordinary television receiver, including the synchronizing pulse and scanning auxiliaries, and the amplifying means ordinarily associated with the same. With the present system the synchronizing pulses can be recorded together with the video frequencies, and reproduced together with the video frequencies for proper control of the television receiver.

Figure 12 illustrates a portion of the magnetic tape 11 with record areas upon the same, assuming that the system is being used for the recording and reproduction of video frequencies. The areas 161 (exaggerated as to width and spacing) represent the rectilinear track areas which are swept by the magnetic head units, and these areas are slightly spaced apart in the direction of the length of the tape, and are disposed at an angle slightly less than 90° with respect to the length of the tape. By way of example where the magnetic tape is two inches in width, each record area may have a width as measured lengthwise of the tape of 10 mils. Dotted lines 162 and 163 represent the demarcation between the tracks which carry the picture intelligence, and the marginal edge portions over which the erase heads are operated. As previously mentioned head 18 operates as an erase head immediately in advance of the head 19, during recording. On the other margin of the tape, head 20 can be connected to a source of alternating current to function as an erase head, in advance of the head 21. Head 21 can be used for the recording of sound signals. Shortly before a head reaches the line 163 a succeeding head reaches the line 162. Switching operations (when employed) occur shortly before the heads reach the lines 163. In Figure 12 it is assumed that the lower marginal edge is being used for the recording of audio frequencies, and the upper margin for recording the control frequency. In both instances the erase operations performed by heads 18 and 20 eliminate most but not all of the track portions carrying duplicated picture information.

Assuming the use of the system for recording and reproducing video frequencies, the overall operation can be briefly reviewed as follows: Switch S1 is positioned as shown in Figure 1, and the rotary head assembly is started in operation by energizing the motor 23. The tape is driven by starting the motor M. The speed of operation of both motors is closely controlled in the manner previously described. The video input is applied to the modulation level control 125, and the desired frequency modulated carrier from the mixer 129 is applied to the amplifier 130, and from thence to the amplifiers 121, 122, 123 and 124, which energize the separate units of the rotary head assembly. The result is that as each head unit sweeps across the tape it records the frequency modulated carrier in the manner previously described. After the recording operation the motors are deenergized and the tape wound back upon the supply reel 12 for a play-back operation. After the rewind operation has been completed, the two motors are again started in operation and by virtue of the manner in which the motors are controlled, the units are caused to accurately track upon the recorded areas. In addition the speed of movement of each unit with respect to its track is controlled to be precisely the same as occurred during recording. The currents induced in the windings of the several head units are applied to the pre-amplifiers 131—134 and from thence to the amplifiers 136 and 137 and the amplifiers 138 and 139. The output from amplifiers 138 and 139, as alternately passed by the switchers 141 and 142, are combined and applied to the limiter 143 and mixer 144. The intermediate center frequency resulting from beating in the mixer 144, is amplified at 147 and after passing through the amplitude limiter 148, is applied to the discriminator 149. The resulting demodulation produces the original video frequencies at the output of the amplifier 151.

Figure 2:
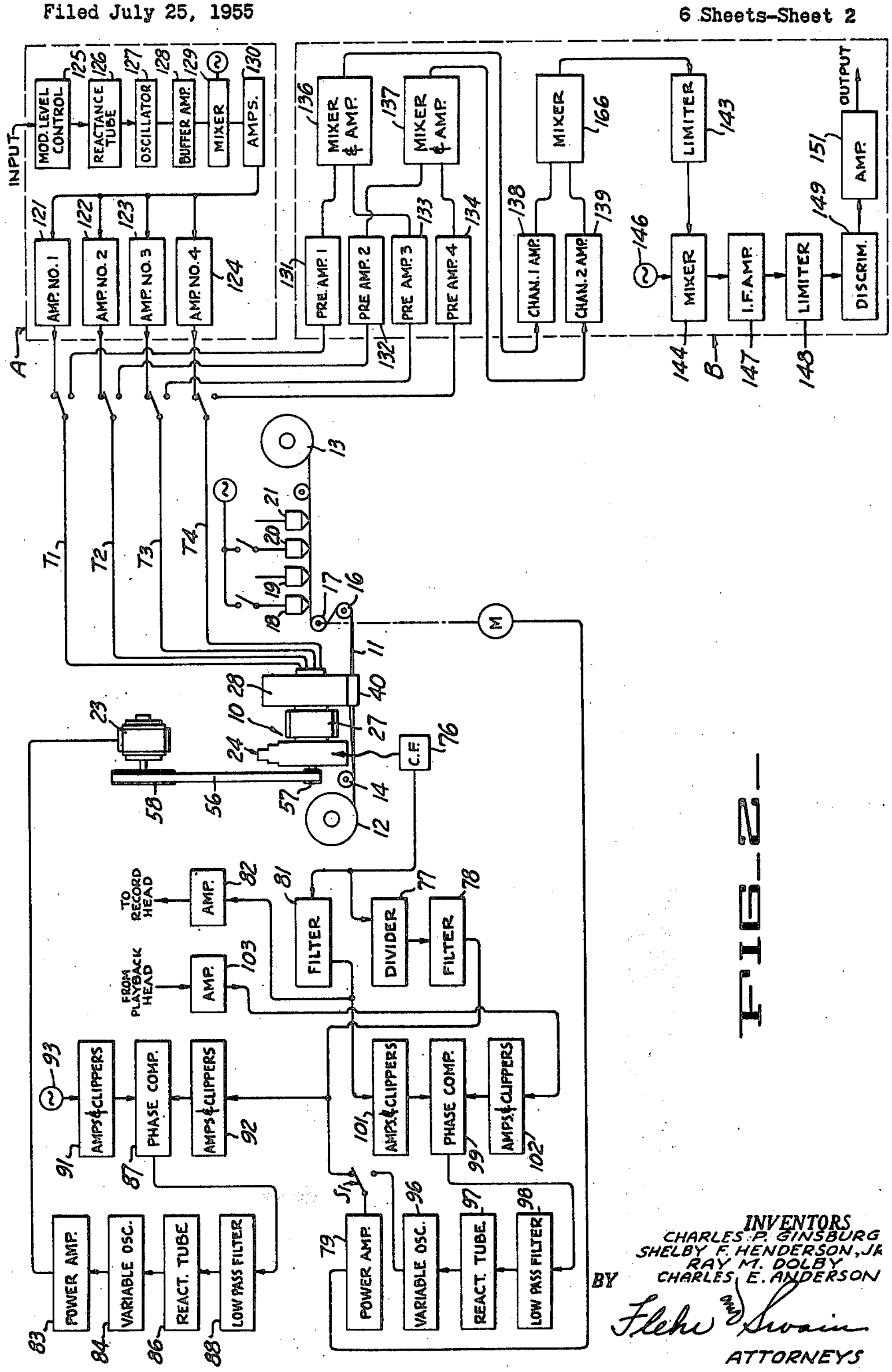
Figure 2 is a circuit diagram illustrating a modification of Figure 1.

Although the switching arrangement illustrated in Figure 1 is desirable, it is possible (but with some sacrifice in performance) to utilize electronics for reproduction as shown in Figure 2, which eliminates this feature. Thus in this instance a mixer 166 connects directly to the outputs of the amplifiers 138 and 139. With this arrangement it is evident that there is some small amount of overlap between the signals applied by the amplifiers 138 and 139, to the mixer. However it has been found that for frequencies ranging up to 1.5 megacycles, such an overlap can be tolerated because the system as a whole is relatively immune to amplitude variations. In other words if such overlaps cause amplitude variations, such variations are largely eliminated by the limiter 143, and cause a minimum of corresponding changes in the output from the amplifier 151.

Although in the foregoing (Figure 1) we have described our system as applied to a modulation frequency spectrum ranging up to about three megacycles, the apparatus can be made to record and reproduce a broader band, as for example frequencies ranging up to four megacycles or higher. For such high frequencies it will be evident that great precision must be employed in the mechanical construction of the equipment, and the rotary head assembly must be operated at a higher speed, to provide a suitable relative speed between the head units and the tape. Assuming that the system is to be used for reproducing a video spectrum with components ranging up to 4 megacycles, the beat frequency oscillator is adjusted to give a center frequency output of 5 or 6 megacycles from the mixer.

In place of using the arrangement described with reference to Figure 1, we can utilize other systems for producing the desired frequency modulated carrier. For example, as will be presently explained, it is possible to use a suitable multivibrator or other oscillator having short time constant characteristics, and which can be controlled in frequency by the amplitude of the modulating voltage applied.

It is generally desirable to provide separate amplifier channels for each of the coils of the rotary head assembly. However it is possible to connect these coils in the manner shown in Figure 11 in which event the output leads can be directly connected to two amplifier channels. It will be noted that in Figure 11 coils 1 and 3 are connected in series between ground and one commutator slip ring. Coils 2 and 4 in turn are connected in series between ground and the other commutator slip ring. Thus two terminal leads are provided (plus ground) for connection with two amplifier channels.

Various types of phase comparators can be used in connection with the motor control system. In Figure 13 we have shown a suitable phase comparator utilizing two diodes. Thus transformer 171 has its secondary terminals connected to the cathode of the diodes 172 and 173. The diodes have their anodes connected across load resistors 174 and 175, which in turn connect with the grounded conductor 176 and to the output conductor 177. A second transformer 178 has one terminal of its secondary connected to a center tap on the secondary of transformer 171. The other secondary terminal of transformer 178 connects to the point of connection between resistors 174 and 175. To briefly review its operation (i.e. for phase comparator 99), a frequency is applied to the primary of transformer 178 from the amplifier and clipper 101. The reproduced signal from amplifier and clipper 102 is applied to the primary of transformer 171. The voltage developed across the secondary of transformer 171 either adds to or subtracts from the secondary voltage of transformer 178, depending upon the instantaneous polarity relationship of the two signals. The average current of each of the diodes 172 and 173 depends upon the length of time during each cycle that their applied voltages are in additive or subtractive polarity. This in turn is dependent upon the phase angle between the two applied waves. When the phase angle is 90° or 270°, the average currents of the diodes are equal, and the equal voltages of opposite polarity are developed across load resistors 174 and 175. Hence the net voltage between conductor 177 and ground will be zero. If the phase angle departs from 90° or 270°, the average diode currents will become unbalanced, and the net output voltage between the conductors 177 and 176 will no longer be zero. Therefore the output voltage polarity will depend upon whether the phase angle is leading or lagging the 90° or 270° relation, and the magnitude will be proportionate to the amount of lead or lag. Assuming that both applied frequencies are of substantially the same wave form, a fairly linear relation between output voltage and phase angle is obtained over a range of 90°. Since the current flow through the diodes is in the form of pulses, it is desirable to provide a low pass filter in the phase comparator output so that only a direct current voltage proportional to the average current is applied to the variable reactor 97.

Figures 14, 15, 16:
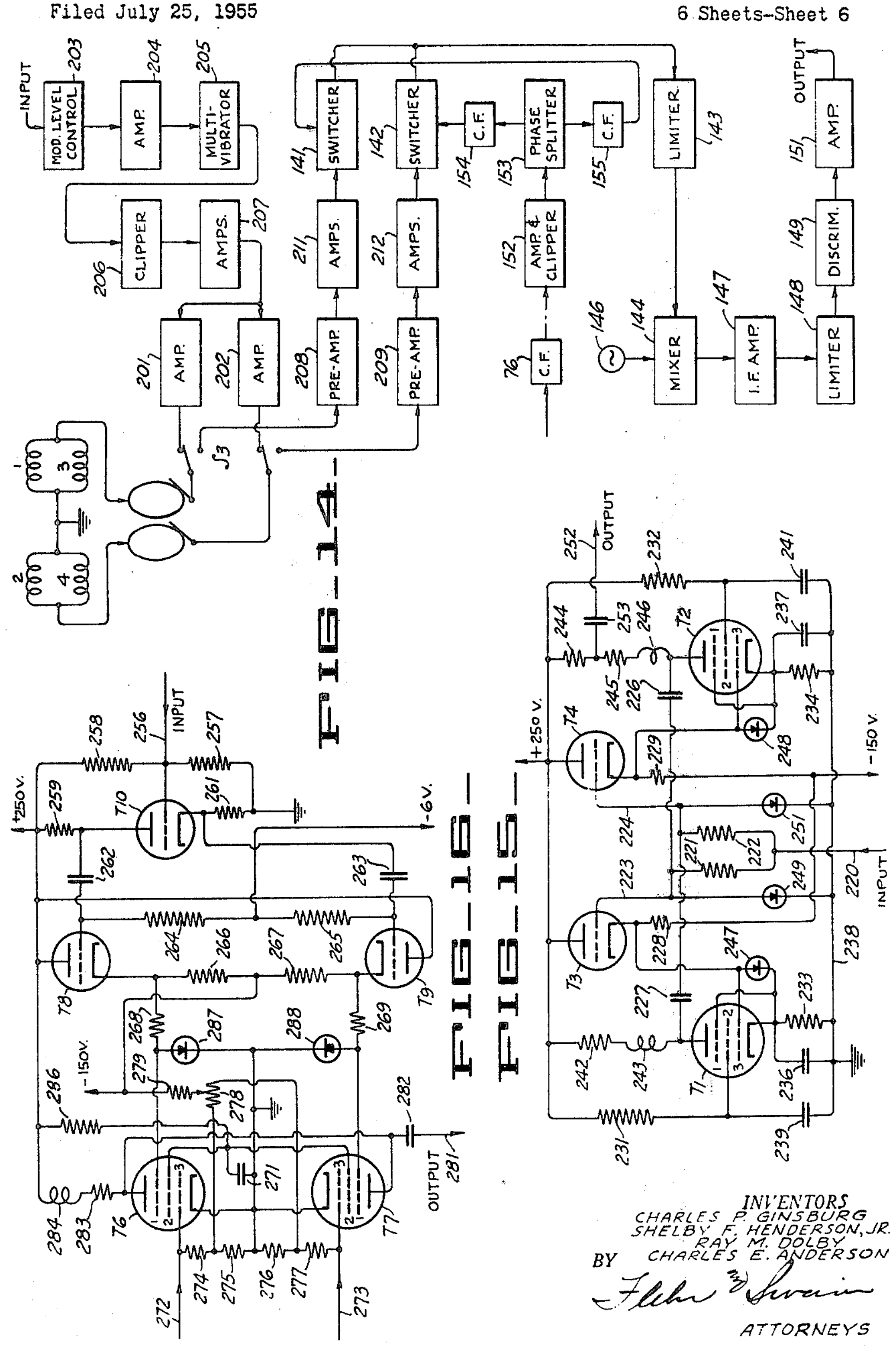
Figure 14 is a schematic block diagram illustrating another embodiment of the invention.
Figure 15 is a circuit diagram illustrating a suitable multi-vibrator which can be used for frequency modulation.
Figure 16 is a circuit diagram illustrating suitable switching means for use with the system.

Figure 14 illustrates a modification of the system shown in Figure 2. In this instance the transducer units of the rotary head are connected in two groups. Units 1 and 3 are connected in parallel to form one group, and units 2 and 4 connected in parallel to form the second group. The connection between these groups is grounded, and the other side of each group connects with a slip ring as illustrated. A multiple switch S3 connects the leads from the slip rings to the outputs of the record amplifiers 201 and 202, which provide two channels. The signal input which may be video frequencies or other frequency components over a wide frequency spectrum are shown applied through the modulation level control 203 to the amplifier 204 and thence to the multivibrator 205. The output of the multivibrator is clipped at 206 to eliminate amplitude modulation components, and the output passed through the amplifiers 207 to record amplifiers 201 and 202 which feed heads 1—3 and 2—4 respectively.

For playback the switch S3 connects the units of the head to the inputs of the preamplifiers 208 and 209, which in turn connect with amplifiers 211 and 212. The outputs of the latter connect with the electronic switchers 141 and 142.

Connecting the heads in parallel in the manner illustrated in Figure 14 is desirable in that it minimizes resonances within a broad frequency band. Also it permits the use of two slip rings instead of four.

A multivibrator circuit suitable for use with the system of Figure 14 is shown in Figure 15. It consists of switching tubes T1 and T2 and the cathode follower tubes T3 and T4. The signal input is applied to the conductor 220, which is coupled through resistors 221 and 222, with leads 223 and 224 that connect with the control grids of the tubes T3 and T4. Lead 223 and the control grid of tube T3 are also coupled to the plate of tube T2, through the condenser 226, and condenser 227 similarly couples the plate of tube T1, with the control grid of tube T4. Cathode resistors 228 and 229 connect the cathodes of tubes T3 and T4 to a suitable source of negative voltage, indicated as —150 v. Each of the tubes T1 and T2 has its suppressor grid 1 directly connected to its cathode. Also these tubes have their screen grids 2 connected through resistors 231, 232, respectively, to a source of positive voltage, indicated as +250 v. The control grids 3 of tubes T1 and T2 are connected to the cathodes of tubes T3 and T4, respectively. Resistors 233 and 234, shunted by condensers 236 and 237 respectively, connect between the cathodes of tubes T1 and T2 to the common lead 238. Condensers 239 and 241 bypass the screens of the tubes T1 and T2 to the common lead 238.

A resistor 242, in series with the peaking coil 243, connects the plate of tube T1 to the +250 v. supply. Series resistors 244 and 245, together with the series peaking coil 246, connect the plate of tube T3 with the +250 v. supply. Suitable clamping means of the diode type is provided for the control grids of the various tubes. Thus the diodes 247 and 248 connect between the control grid and cathode of the tubes T1 and T2 respectively, and the diodes 249 and 251 connect the control grids of tubes T3 and T4 respectively to the common lead 238. These diodes prevent the grids of the tubes to which they connect, from becoming too positive. The output lead 252 is coupled to the point of connection between resistors 244 and 245, by condenser 253.

The multivibrator described above by reference to Figure 15, operates in a manner similar to conventional equipment of this type, except that in this instance the input lead 220 is coupled to the multivibrator tubes T1 and T2, through tubes T3 and T4 which function as cathode followers. For a given base voltage applied by lead 220, the multivibrator is free running at the desired mean frequency. Variations in voltage applied by the input, corresponding to the input signal, cause corresponding variations in the operating frequency, thus providing a frequency modulated output.

By way of example in one instance the circuit shown in Figure 15 was constructed as follows: Tubes T1 and T2 were of the type known by manufacturer's specification (U.S.A.) as type 6CL6. Tubes T3 and T4 were of the type known by manufacturer's specification as type 12AT7. The diodes 247 and 248 were of the type known by manufacturer's specification as type IN34, and diodes 249 and 251 were type IN55A. The various resistors had values as follows: 231, 27 K. (where K equals 1,000 ohms); 242, 2.7 K.; 233, 180 ohms; 228, 15 K.; 221, 10 K.; 222, 10 K.; 229, 15 K.; 234, 180 ohms; 244, 560 ohms; 245, 2.2 K.; 232, 27 K. The various condensers had values as follows: 239, 0.01 mfd. (microfarad); 236, 0.05 mfd. 226 and 227, 7 mfd. each; 237, 0.05 mfd.; 241, 0.01 mfd.; 253, 0.05 mfd. The coils 243 and 246 had inductance values of 36 $\mu h$ (microhenries).

The multivibrator cited above by way of example operated satisfactorily on a selected center frequency with a range of from 2 to 4 megacycles, with a relatively small ratio of $\Delta F/f_m$ for applied signal (i.e. video) frequencies over a wide frequency spectrum.

Figure 16 illustrates a suitable circuit for the switchers 141 and 142, and also for the phase splitter 153 and the cathode followers 154 and 155. In this instance tubes T6 and T7 function as switching tubes, tubes T8 and T9 function as cathode followers, and tube T10 serves as a phase splitter. The input lead 256 is applied to the control grid of tube T10, and this grid also connects to ground through grid resistor 257, and to a source of biasing voltage, such as the indicated +250 v., through resistor 258. The plate of this tube connects to the indicated +250 v. through resistor 259, and the cathode connects to ground through the cathode lead resistor 261. The plate of tube T10 is coupled by condenser 262 with the control grid of cathode follower tube T8, and the control grid of tube T9 is similarly coupled to the cathode of tube T10, through condenser 263. The indicated −6 v. bias supply is connected to the control grids of tubes T8 and T9, through the resistors 264, 265. The indicated −150 v. supply connects with the cathodes of tubes T8 and T9, through the cathode resistors 266, 267. The plates of both these tubes connect to the indicated +250 v. supply. The suppressor grids 1 of the tubes T6 and T7 are connected to the cathodes of tubes T8 and T9, through the resistors 268, 269. The screen grids 2 of these tubes T6 and T7 are directly connected together and are connected to ground through condenser 271.

The input leads 272, 273 (from amplifiers 211 and 212) directly connect with the control grids of tubes T6 and T7. Also these leads are connected to ground through the series connected grid resistors 274, 275, and 276, 277. A potentiometer 278 has its one terminal connected to the point of connection between resistors 274 and 275, and its other terminal to the point of connection between resistors 276 and 277. The movable contact of this potentiometer is connected by resistor 279 to the indicated −150 v. supply. By adjusting the potentiometer 278, the bias upon the control grids of the tubes T6 and T7 can be adjusted for proper balanced operation. The output lead 281 is coupled to the plates of tubes T6 and T7, through condenser 282. These plates are directly connected, and also they connect through resistor 283 and peaking coil 284, to the indicated +250 v. supply. The screen grids 2 of the tubes T6 and T7 also connect to the +250 v. supply, through resistor 286.

Clamping means of the diode type are also provided in this circuit for preventing the suppressor grids 1 of the tubes T6 and T7, from becoming too positive. Thus diodes 287 and 288 connect between the suppressor grid 1 and ground for the tubes T6 and T7 respectively.

The circuit illustrated in Figure 16 functions as follows: Assuming that a substantially square wave is applied to the input lead 256, the phase splitter formed by tube 10 and its associated circuit components provides split phase voltages on the grids of the cathode follower tubes T8 and T9, which in turn are coupled to the suppressor grids 1 of tubes T6 and T7. Thus these grids are alternately driven between voltage values, to provide alternate conducting and nonconducting states for the tubes T6 and T7. During the period that one of the tubes T6 or T7 is conducting, signals applied to one or the other of the corresponding input leads 272, 273, are repeated to the output lead 281.

By way of example in one instance the circuit of Figure 16 was constructed as follows: The vacuum tubes T6 and T7 were of a type known by manufacturer's specification as type 6AS6. The tubes T8 and T9 were of a type known by manufacturer's specification as type 12AT7. The tube T10 was of the type known by manufacturer's specification as type 12AT7. The diodes were of a type known by manufacturer's specification as type CK705. The various resistors had values as follows: 274, 270 K.; 275, 12 K.; 276, 12 K.; 277, 270 K.; 283, 3.3 K.; 286, 22 K;. 279, 750 K.; 278, 20 K.; 268 and 269, 47 K.; 266 and 267, 27 K.; 264 and 265, 1 megohm; 259, 22 K.; 261, 22 K.; 258, 180 K.; 257, 82 K. The peaking coil 284 had an inductance of 150 $\mu$h. The condensers had values as follows: 271, 4 mfd.; 282, 0.25 mfd.; 262, 0.25 mfd.; 263, 0.25 mfd.

The switching circuit cited above by way of example gave good results with substantially instantaneous switching as determined by the pulses applied to the input lead 256. As previously described these pulses were derived from the photoelectric pulse generator associated with the rotary head.

It will be evident that our system and method can be used wherever it is desirable to record a wide frequency spectrum, ranging substantially higher than can be recorded by the use of conventional magnetic tape equipment. Particularly the invention can be used with good results for recording and reproducing television or like visual images.

We claim:

1. A method of recording a frequency spectrum in a recording system, said method comprising frequency modulating a carrier frequency with the frequency spectrum so that the maximum deviation of the carrier frequency is less than the maximum frequency of the frequency spectrum, and recording the frequency modulated carrier in the recording system, said carrier frequency being near enough to the upper frequency limit of the band pass of the recording system that a substantial portion of the upper side band spectrum of the frequency modulated carrier is attenuated.

2. A method of recording a frequency spectrum in a recording system, comprising frequency modulating a carrier frequency with the frequency spectrum so that the maximum deviation of the carrier frequency is small relative to the maximum frequency of the frequency spectrum, said carrier frequency being substantially nearer to the upper frequency limit of the band pass of the recording system than a frequency equal to the maximum frequency of the frequency spectrum, and recording said frequency modulated carrier in the recording system.

3. A method of recording a signal having a band width greater than the recordable band pass of a recording system which system includes a magnetic tape, and a magnetic recording head movable at a predetermined speed relative to the tape, the maximum frequency of the signal being less than the upper frequency limit of the band pass, said method comprising frequency modulating a carrier with the signal so that maximum deviation of the carrier is substantially less than the maximum frequency of the signal, said carrier frequency being substantially nearer to the upper frequency limit of the band pass than a frequency equal to the maximum frequency of the signal and being above and adjacent to the maximum frequency of the signal, and applying said frequency modulated carrier to the head to thereby record the frequency modulated carrier on said tape.

4. A method of recording a television signal which has a band width ranging from approximately 10 cycles to approximately 4 megacycles in a recording system which includes a magnetic tape, and a magnetic recording head movable at a predetermined speed relative to the tape, the recordable band pass of said head and said tape being less than the band width of said television signal, said method comprising frequency modulating a carrier frequency of approximately 5 megacycles with the television signal so that the maximum deviation of the carrier frequency is substantially less than four megacycles, said carrier frequency being substantially nearer to the upper frequency limit of the recordable band pass than for megacycles, and applying said frequency modulated carrier to the head to thereby record the modulated carrier on said tape.

5. Apparatus for recording a frequency spectrum, comprising a recording medium, a recorder in recording relationship with said medium, means for providing a carrier frequency, means connected to said carrier providing means for frequency modulating the carrier frequency with the frequency spectrum so that the maximum deviation of the carrier frequency is small relative to the maximum frequency of the frequency spectrum, and means for connecting the frequency modulated carrier to said recorder, the carrier frequency being near enough to the upper frequency limit of the band pass of said recorder and said recording medium that a substantial portion of the upper side band spectrum of the frequency modulated carrier is attenuated.

6. Apparatus for recording a frequency spectrum, comprising a recording medium, a recorder in recording relationship with said medium, means for providing a carrier frequency which is substantially nearer to the upper frequency limit of the recordable band pass of said recorder and said recording medium than a frequency equal to the maximum frequency of the frequency spectrum, means connected to said carrier providing means for frequency modulating the carrier frequency with the frequency spectrum so that the maximum deviation of the carrier frequency is substantially less than the maximum frequency of the frequency spectrum, and means for connecting the frequency modulated carrier to said recorder.

7. An apparatus for recording a signal, comprising a magnetic tape, a magnetic record head movable at a predetermined speed relative to said tape, the recordable band pass of said tape and record head being less than the band width of the signal and the upper frequency limit of the band pass being greater than the maximum frequency of the signal, means for providing a carrier frequency which is substantially nearer the upper frequency limit of the recordable band pass than a frequency equal to the maximum frequency of the signal, means connected to said carrier providing means for frequency modulating the carrier frequency with the signal so that the maximum deviation of the carrier frequency is small relative to the maximum frequency of the signal, and means for connecting the frequency modulated carrier to said record head.

8. An apparatus for recording a television signal which has a band width ranging from approximately 10 cycles to approximately 4 megacycles, comprising a magnetic tape, a magnetic recording head movable at a predetermined speed relative to said tape, the recordable band width of said head and tape being less than the band width of the television signal, means for providing a carrier frequency of approximately 5 megacycles, the upper frequency limit of the recordable band pass being substantially closer to the carrier frequency than 4 megacycles, means connected to said carrier providing means for frequency modulating the carrier frequency with the television signal so that the maximum deviation of the carrier frequency is substantially less than 4 megacycles, and means for connecting the frequency modulated carrier to said record head.

References Cited in the file of this patent

UNITED STATES PATENTS

| | | |
|---|---|---|
| 2,245,286 | Marzocchi | June 10, 1941 |
| 2,461,368 | Bradley | Feb. 8, 1949 |
| 2,604,321 | Williams | July 22, 1952 |
| 2,612,566 | Anderson | Sept. 30, 1952 |
| 2,641,656 | Dicke | June 9, 1953 |
| 2,648,589 | Hickman | Aug. 11, 1953 |
| 2,668,283 | Mullin | Feb. 2, 1954 |

UNITED STATES PATENT OFFICE

CERTIFICATION OF CORRECTION

Patent No. 2,956,114 October 11, 1960

Charles P. Ginsburg et al.

It is hereby certified that error appears in the above numbered patent requiring correction and that the said Letters Patent should read as corrected below.

Column 11, line 42, for "7 mfd." read -- 7 mmfd. --; column 13, line 42, for "for" read -- four --.

Signed and sealed this 16th day of May 1961.

(SEAL)
Attest:

ERNEST W. SWIDER
Attesting Officer

DAVID L. LADD
Commissioner of Patents